May 12, 1942. P. DE ROSE 2,282,991
COMBINATION MOTION PICTURE CAMERA, SCREEN, AND PROJECTOR
Filed Oct. 25, 1940
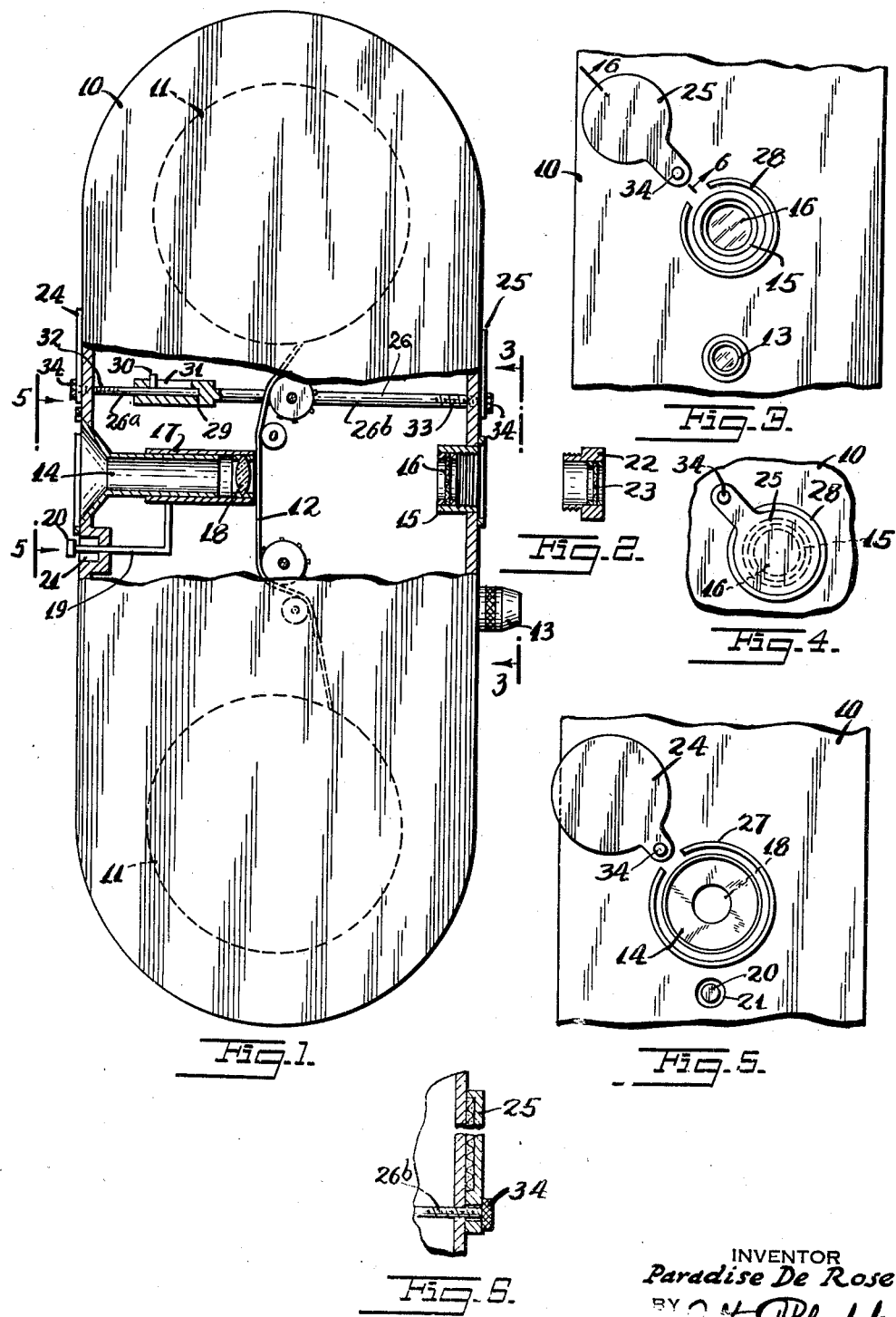
INVENTOR
Paradise De Rose
BY
ATTORNEY Patented May 12, 1942

2,282,991

UNITED STATES PATENT OFFICE 2,282,991

COMBINATION MOTION PICTURE CAMERA, SCREEN, AND PROJECTOR

Paradise De Rose, New York, N. Y.

Application October 25, 1940, Serial No. 362,739

5 Claims. (Cl. 88—16)

This invention relates to new and useful improvements in a combination motion picture camera, screen and projector.

The invention proposes the construction of a combination motion picture camera, screen and projector which is characterized by a light proof body having the usual means for moving a strip of film past a mechanically operated lens for the purpose of recording images in front of the lens on the said film.

It is a further object of this invention to provide the light proof body with an eye piece mounted on one side of the body and opposed to a window on the other side of the body and in a path to permit the film, when developed, to be viewed by looking through same.

Still further it is proposed to provide the eye piece with an adjustably mounted enlargement lens arranged in a manner to permit the same to be adjusted with relation to the developed film for the purpose of enlarging the images contained thereon to be more easily viewed.

A further object of this invention proposes the provision of a screen engageable against the window in a manner to permit images to be cast thereon when a light is positioned behind said eye piece for permitting the images of the film to be viewed upon the said screen.

The invention further proposes a pair of oppositely arranged shutters for the eye piece and the window arranged in a manner to be projected there-across so as to prevent the entrance of light therethrough to permit the device to be used as a camera permitting the lens to focus images upon a strip of undeveloped film moved therebehind.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure—

Fig. 1 is a side elevational view of a combination motion picture camera, screen and projector constructed according to this invention and having a portion thereof vertically sectioned to reveal interior construction.

Fig. 2 is a vertical sectional view of the screen for use upon the window opening on the camera.

Fig. 3 is a detailed view looking in the direction of the line 3—3 of Fig. 1.

Fig. 4 is a view similar to Fig. 3 but illustrating the closed position of the shutter.

Fig. 5 is an enlarged detailed view looking in the direction of the line 5—5 of Fig. 1.

Fig. 6 is an enlarged sectional view taken on the line 6—6 of Fig. 3.

The combination motion picture camera, screen and projector, according to this invention, includes a light proof body 10 enclosing a pair of rotatively mounted spaced spools 11 which are adapted to carry a length of film 12, either developed or undeveloped, depending upon how the device is being used as will be hereinafter more fully described. This light proof body 10 is provided with a conventional lens 13 and is also provided with a spring operated motor and shutter, not shown on the drawing, which are adapted to be utilized for recording images in front of the lens 13 upon a strip of undeveloped film as it is moved across the back of the lens 13. This construction permits the device to be used as a camera for recording desired images upon undeveloped film.

It is also possible to use the device as a projector for viewing developed film. To accomplish this the light proof body 10 is provided with an eye piece 14 mounted on one side of the body 10 and opposed to a window 15 mounted on the other side of the body 10 in a path to permit a developed strip of film to be viewed as it is passed therebetween. The eye piece 14 is characterized by a tubular metal member mounted in position upon one wall of the body 10. The window is characterized by a tubular metal member mounted upon the other wall of the body 10. This latter tubular metal member carries a lens 16 securely mounted in position therein. This lens 16 may be constructed to magnify or may merely be a piece of ordinary window glass. The eye piece 14 carries an adjustable enlargement lens which is characterized by a tubular member 17 which is slidably engaged upon the inner end of the eye piece 14. This tubular member 17 carries an enlargement lens 18 securely mounted in position upon the inner end thereof.

A means is provided for permitting the enlargement lens to be adjusted from the outside of the body 10 for permitting the same to be focused. This means comprises an L-shaped arm 19 which has its inner end securely attached to the tubular member 17 and its free end projected to the exterior of the body 10 and which is provided with a knob 20 for permitting the same to be extended or retracted to similarly move the tubular member 17 relative to the eye piece 14 for bringing the lens 18 into its proper focused position. The knob 20 when not in use is adapted to be positioned within an opening 21 formed in the side of the body 10 and which surrounds the projected end of the L-shaped arm 19.

When the lens 18 is properly adjusted one may look through the eye piece 14 in a straight line with the window 15 for permitting a developed strip of film 12 passing between the lens 18 and window 15 to be viewed. It is also proposed to provide a screen which is adapted to be used across the window opening 15 of the body 10. This screen is characterized by a tubular plug 22 which is adapted to be positioned within the free end of the window opening 15. A screen 23 is mounted across the outer end of the tubular plug 22 and is preferably constructed of cloth or other similar translucent material. The tubular plug when screwed in position within the window opening 15 permits a light to be positioned behind the eye piece 14 to project light therethrough and through the lens 18 to cast the image of a strip of developed film on the screen 23 to be viewed from the front side of the light proof body 10.

A means is provided for permitting the eye piece 14 and window opening 15 to be closed to prevent the entrance of light into the body 10 when the device is being used to record images upon a strip of undeveloped film 12. This means comprises a shutter 24 for the eye piece 14 and a shutter 25 for the window opening 15. Each of these shutters 25 is freely mounted upon the outer end of a rod 26 extended completely through the light proof body 10. A circular ridge 27 encircles the eye piece 14 and when the shutter 24 is in position within this ridge it is extended across the eye piece to light seal the same. Similarly, the window opening 15 is provided with a circular ridge 28 encircling the same and when the shutter 25 is in position within the circular ridge it is extended across the window opening for light sealing this opening.

A means is provided for holding the shutters either in their operative or inoperative positions, depending on the use to which the device is to be put. To accomplish this the rod 26 is formed of separate sections comprising a section 26ᵃ and a section 26ᵇ. The inner end of the section 26ᵇ is provided with an enlarged receiving recess 29 into which the free end of the section 26ᵃ is slidably extended. A means is provided for permitting the sections 26ᵃ and 26ᵇ to slide relative to each other but to prevent complete disengagement thereof. This means comprises a radial pin 30 mounted upon the section 26ᵃ and which engages a slot 31 formed in the section 26ᵇ. The slot 31 is extended longitudinally of the section 26ᵇ and the pin 30 is free to move the length thereof to permit relative movement of the sections 26ᵃ and 26ᵇ. The section 26ᵃ is provided with a right hand thread 32 which engages its respective wall of the light proof body 10, and the section 26ᵇ is provided with a left hand thread 33 which engages its respective wall of the light proof body 10. Thus as the rod 26 is turned the sections 26ᵃ and 26ᵇ thereof will slide relative to each other to cause the projected ends of the sections to be extended or retracted with relation to the walls of the light proof body 10.

The shutters 24 and 25 are freely maintained on the projected ends of the shaft 26 and in the extended positions thereof are adapted to be engaged into or out of their respective circular ridges 27 and 28. The free ends of the rod 26 are provided with knobs 34 which are adapted to bear against the faces of the shutters 24 and 25 for securely locking the same in their operative or inoperative positions in the retracted positions of the ends of the rod 26.

The operation of this invention is as follows:

When it is desired to record images upon a strip of undeveloped film 12 it is merely necessary to position the film within the light proof body 10 and close the eye piece 14 and window 15 by engaging the shutters 24 and 25 thereacross to prevent the entrance of light through these openings. The spring motor of the device is then set in operation which will move the undeveloped film 12 across the back of the lens 13 and simultaneously operate the shutter thereof to cause images to be recorded upon the film.

When the film is developed and it is desired to view the same the developed strip of film is positioned in the light proof body and the shutters 24 and 25 are moved from their operative positions across the eye piece 14 and window 15. One may look through the eye piece 14 and properly adjust the lens 18 to bring the same into focus and permit the film 12 to be viewed as it is progressively moved between the eye piece 14 and window opening 15 by the spring operated motor of the device.

It is to be understood that this device may be made of any desired material and size so that it may be used as a useful apparatus or as a toy for children.

While I have illustrated and described the preferred embodiments of my invention, it is to be understood that I do not limit myself to the precise constructions therein disclosed and the right is reserved to all changes and modifications coming within the scope of the invention as defined in the appended claims.

Having thus described my invention, what I claim as new, and desire to secure by United States Letters Patent is:

1. In a motion picture camera having a light proof body with a pair of opposed walls and means for supporting and moving a sensitive film vertically of said body, a lens mounted on one of said walls for recording a series of images on said film, a window opening formed in said wall having said lens at a position above said lens, an inwardly extended tubular eye piece mounted on the other wall of said pair of opposed walls and in coaxial alignment with said window opening, a tubular member slidably engaged on the inner end of said eye piece, an enlargement lens mounted on the inner end of said tubular member, a shutter for said eye piece, a shutter for said window opening, and means for moving said tubular member relative to said eye piece for bringing said lens into focus, said means comprising an L-shaped arm having one of its ends attached to said tubular member and the other of its ends projected to the exterior of said light proof body.

2. In a motion picture camera having a light proof body with a pair of opposed walls and means for supporting and moving a sensitive film vertically of said body, a lens mounted on one of said walls for recording a series of images on said film, a window opening formed in said wall having said lens at a position above said lens, an eye piece having an enlargement lens mounted on the other wall of said pair of opposed walls and in coaxial alignment with said window opening, a disc-like shutter for said window opening, a disc-like shutter for said eye piece, circular ridges formed on said opposite walls of said body and encircling said eye piece and window opening and into which said shutters engage for light proof sealing of said body when a sensitive film is being used within said body, and means for supporting said shutters so that they may be removed from said circular ridges to expose said eye piece and window opening to permit a developed film to be used in said body and be viewed through said eye piece.

3. In a motion picture camera having a light proof body with a pair of opposed walls and means for supporting and moving a sensitive film vertically of said body, a lens mounted on one of said walls for recording a series of images on said film, a window opening formed in said wall having said lens at a position above said lens, an eye piece having an enlargement lens mounted on the other wall of said pair of opposed walls and in coaxial alignment with said window opening, a disc-like shutter for said window opening, a disc-like shutter for said eye piece, circular ridges formed on said opposite walls of said body and encircling said eye piece and window opening and into which said shutters engage for light proof sealing of said body when a sensitive film is being used within said body, and means for supporting said shutters so that they may be removed from said circular ridges to expose said eye piece and window opening to permit a developed film to be used in said body and be viewed through said eye piece, said latter means, comprising a rod extended through said body and having its ends threaded in opposite directions and threadedly projected through and beyond the opposed walls of said body in the vicinity of said eye piece and window opening, said shutters being pivotally mounted on the ends of said rod, said rod being formed of separate sections telescopically connected together to permit relative axial movement, and enlarged heads formed on the ends of said sections and engageable against said shutters for clamping said shutters in position against the walls of said body, whereby either of said heads may be gripped and turned for moving said rod sections axially apart to disengage said heads from said shutters so that said shutters may be pivoted relative to said rod to be engaged into or out of said ridges.

4. In a motion picture camera having a light proof body with a pair of opposed walls and means for supporting and moving a sensitive film vertically of said body, a lens mounted on one of said walls for recording a series of images on said film, a window opening formed in said wall having said lens at a position above said lens, an eye piece having an enlargement lens mounted on the other wall of said pair of opposed walls and in coaxial alignment with said window opening, a disc-like shutter for said window opening, a disc-like shutter for said eye piece, circular ridges formed on said opposite walls of said body and encircling said eye piece and window opening and into which said shutters engage for light proof sealing of said body when a sensitive film is being used within said body, and means for supporting said shutters so that they may be removed from said circular ridges to expose said eye piece and window opening to permit a developed film to be used in said body and be viewed through said eye piece, said latter means, comprising a rod extended through said body and having its ends threaded in opposite directions and threadedly projected through and beyond the opposed walls of said body in the vicinity of said eye piece and window opening, said shutters being pivotally mounted on the ends of said rod, said rod being formed of separate sections telescopically connected together to permit relative axial movement, and enlarged heads formed on the ends of said sections and engageable against said shutters for clamping said shutters in position against the walls of said body, whereby either of said heads may be gripped and turned for moving said rod sections axially apart to disengage said heads from said shutters so that said shutters may be pivoted relative to said rod to be engaged into or out of said ridges, said connection between said rod sections, comprising a receiving socket formed on the inner end of one of said rod sections and into which the inner end of the other of said rod sections extends, and a pin mounted on the end of said rod section which extends into said receiving socket, said pin being extended into an elongated slot formed longitudinally in one wall of said receiving socket preventing relative rotative movement of said sections while permitting relative axial movement.

5. In a motion picture camera having a light proof body with a pair of opposed walls and means for supporting and moving a sensitive film vertically of said body, a lens mounted on one of said walls for recording a series of images on said film, a window opening in the form of an inwardly extended tubular projection formed in said wall having said lens at a position above said lens, an eye piece having an enlargement lens mounted on the other wall of said pair of opposed walls and in coaxial alignment with said window opening, and a screen for engagement across said window opening, comprising a tubular plug for engagement into the outer end of said window opening, and a screen of translucent material engaged across the outer end of said tubular plug.

PARADISE DE ROSE.